June 30, 1936.    R. NOSKE    2,045,670
SIGHTING DEVICE
Filed Jan. 23, 1935

INVENTOR.
RUDOLF NOSKE
BY Adelbert Schapp
ATTORNEY.

Patented June 30, 1936

2,045,670

UNITED STATES PATENT OFFICE 2,045,670

SIGHTING DEVICE

Rudolf Noske, San Carlos, Calif.

Application January 23, 1935, Serial No. 2,989

3 Claims. (Cl. 33—50)

The present invention relates to sighting devices for rifles, guns and the like and has particular reference to a sighting device adapted to be used in connection with a telescope attached to the gun.

The principal object of the invention is to provide a sighting device to be used in a telescope that allows of flexible, fine adjustments of the sight within the telescope.

A further object of the invention is to support the sight within the telescope in such a manner that it may be adjusted with great accuracy and will not lose its adjustment under the influence of the recoil.

It is well known that a small and light piece of metal will be least affected by the recoil and my sighting device is constructed in such a manner that the sight itself does not form an integral or closely connected part of the heavy metal but is supported on a light springy member, while the adjustments for elevation and windage are effected inside the telescope where they are protected from harm, moisture and dirt.

A further object of the invention is to provide means whereby adjustment of the sight may be effected from the outside of the telescope, while means are provided for protecting the outside adjusting means from accidental contact with and displacement by underbrush or the like.

A still further object of the invention is to arrange the outside adjusting means in such a manner that adjustment proceeds stepwise, each step providing a certain degree of adjustment as for instance one inch for a distance of one hundred yards.

Further and other objects of the invention will appear as the specification proceeds.

Figure 1:
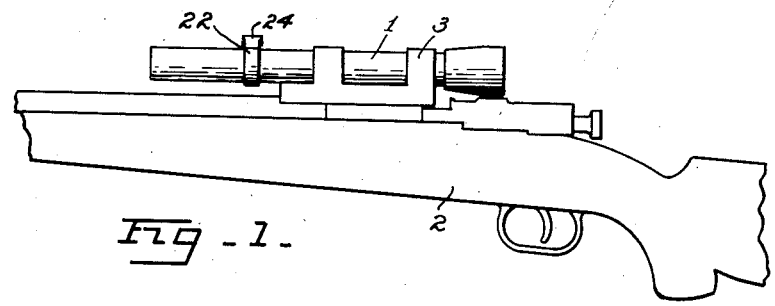
Figure 2:
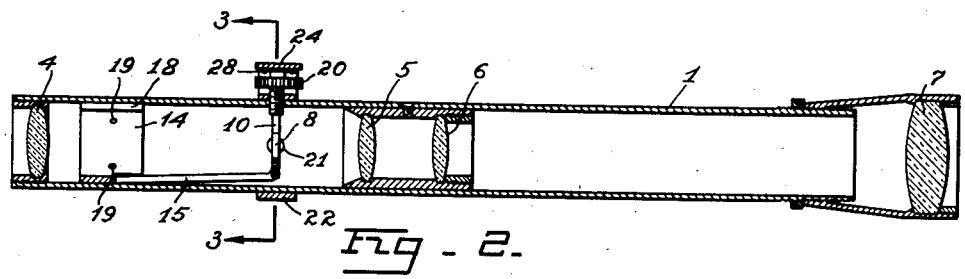
Figure 3:
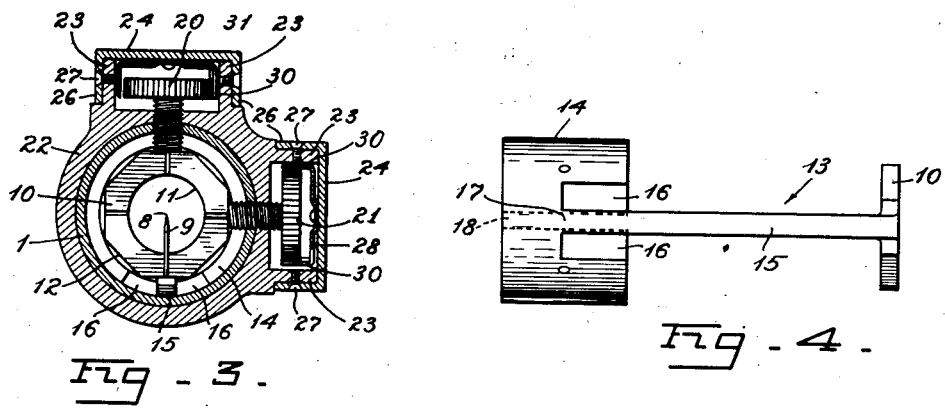
Figure 4:
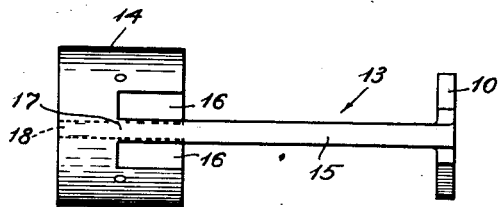
Figure 5:
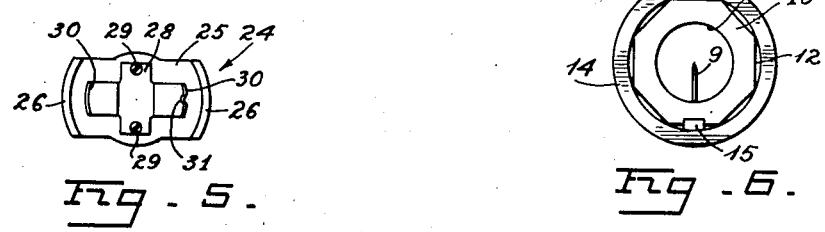
Figure 6:
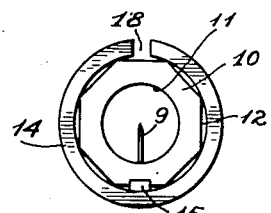

The preferred form of my invention is illustrated in the accompanying drawing in which Figure 1 shows a fragmentary side elevation of a gun having my telescope with its sighting device mounted thereon, Figure 2 a vertical longitudinal section through my telescope with its sighting device;

Figure 3 a transverse section taken along line 3—3 of Figure 2,

Figure 4 a detail view in bottom plan of my sighting device,

Figure 5 an inside view of a cap used for the external adjusting member for my sighting device, and Figure 6 an end view of my sighting device taken by itself.

While I have shown only the preferred form of my invention it should be understood that various changes and modifications may be made within the scope of the claims hereto attached without departing from the spirit of the invention.

Referring to the drawing in detail, the telescope 1 is secured on the gun 2 by any suitable mounting 3, which causes the telescope to be arranged in parallel relation to the barrel of the gun and in the sight line of the operator. The telescope may be of any preferred construction and is shown in the drawing as having four lenses 4, 5, 6 and 7, the front and rear lenses 4 and 7 being mounted with freedom of adjustability lengthwise of the telescope to allow the focal point of the telescope to remain fixed at 8 while the telescope is adjusted for different eyes.

The sight 9 which may be in the form of a thin pin, is supported in a ring 10 which has a circular opening as at 11 and an octagonal outer face as at 12. The ring 10 is somewhat smaller, in its outer circumference, than the bore of the telescope so that it may be adjusted to different positions in the cross-sectional area of the telescope. The point of the pin 9 occupies the center of the ring 10 so that when the ring is adjusted to central position relative to the bore of the telescope the point of the pin lies in the axis of the telescope. The ring may be adjusted however, vertically and laterally to move the point of the sight vertically and laterally of the axis of the telescope for elevation and windage. The ring is disposed in the transverse focal plane of the telescope.

The ring 10 forms part of the ring support 13 shown in detail in Figures 4 and 6, the support including a sleeve 14 and a relatively thin strip of material 15 which supports the ring at a considerable distance from the sleeve 14. The ring support and the ring, which form a single unit, are preferably made of bendable, springy metal, such as brass, so that the strip 15 may be bent for bringing the ring 10 into a desired initial position while at the same time it will offer spring opposition to an agency tending to move it out of initial position. Two recesses 16 are provided in the sleeve 14 on opposite sides of the strip 15 so that the latter takes its inception substantially in the center of the sleeve as at 17. The sleeve is split as shown at 18 and is dimensioned to just make a tight fit in the bore of the telescope when the two margins defining the split are forced together. It is introduced into the bore of the telescope from in front and is held in position by a plurality of screws indicated at 19.

Before the sight support 13 is introduced into the telescope the strip 15 is bent so that when unaffected by other agencies the point of the sight will be slightly above the axis of the telescope and also slightly to the right of the axis. For effecting desired adjustments I provide two set screws 20 and 21 passing radially through the wall of the telescope from above and from the right hand side. For reinforcing the material of the telescope in the set screw region I provide a collar 22 on the telescope into which the set screws are threaded. The set screws bear on the flat faces of the octagonal ring 10 and when the set screw 20 is turned downward it moves the point of the sight downward toward the axis and beyond the axis. When the set screw 21 is turned inwardly it moves the point of the sight to the left toward the axis of the telescope and beyond the axis. If either set screw is turned in the opposite direction the spring tension of the strip 15 causes the point of the sight to follow the set screw toward the initial position of the sight so that any desired adjustment may be obtained, vertically and horizontally, for elevation and windage.

The heads of the two set screws 20 and 21 project beyond the collar, are of convenient size for manual operation and are notched in their peripheries. Each of them has two flanges 23 disposed on opposite sides thereof, the flanges being coextensive in width with the width of the collar 22 and the heads of the set screws being sufficiently large to project beyond the flanges forwardly and rearwardly for manual operation. A cap 24 is provided for each set screw. One of the caps is illustrated in detail in Figure 5 and comprises a cover plate 25 and two flanges 26 adapted to be telescoped on the flanges 23 and to be secured thereto by screws 27. The cap is of the same width as the collar 22 and does not interfere with the manipulation of the set screw.

Each cap has a clip 28 secured to the under face thereof by means of screws 29 and each clip has two spring lips 30 depending therefrom which are disposed on opposite sides of the set screw heads when the cap is in place. One of the spring lips 30 has an indentation 31 which enters the registering notch of the set screw head for holding the same yieldingly in position. When the set screw is turned for effecting adjustment the yielding lip riding from one notch to another makes a slight clicking noise. The notches are spaced so that adjustment by one notch equals an adjustment of the sight of one inch at a distance of one hundred yards so that the operator may make any desired adjustment by listening to the clicking, even in the dark. At the same time the lip locks the set screws or any dial associated therewith in position. The caps also serve, of course, the purpose of protecting the set screws from underbrush and the like.

The operation of my sighting device will be readily understood from the foregoing description. Prior to the insertion of the sight support 13 the strip 15 is bent, as partly indicated in Figure 2, to bring the point of the sight slightly above the axis of the telescope and slightly to the right of the axis. The support is then introduced and secured in place by means of the screws 19, the latter being arranged so that the ring 10, when in position, is disposed in the transverse plane of the focal point of the telescope. The set screws are now introduced to bear on the upper and right hand flat faces of the octagonal ring and the set screws may be used to urge the point of the sight into any desired position against the spring tension of the strip 15. It will be noted that the ring 10 in which the sight is supported is light in weight and does not form any immediate or closely connected part of a heavy assembly but is entirely supported by the relatively slender strip 15 so that the shock of the recoil which is greatest where it effects heavy masses, is hardly felt by the light sight ring supported at the end of a slender and springy strip.

I claim:

1. In combination with a telescope or the like, means for adjustably supporting a sight element therein, a set screw in the wall of the telescope for adjusting the sight element, the set screw having notches therein, a cap for protecting the set screw and a spring element associated with the cap engageable with the notches for yieldably holding the set screw in adjusted position.

2. Sight supporting means for a telescope or the like comprising a split sleeve adapted to be forced into the telescope and tending to expand against the wall of the telescope for anchoring the sleeve, a strip of material projecting from the sleeve lengthwise of the telescope and a sight supporting element secured to the free end of the strip.

3. Sight supporting means for a telescope or the like comprising a split sleeve adapted to be forced into the telescope and tending to expand against the wall of the telescope for anchoring the sleeve, a strip of material projecting from the sleeve lengthwise of the telescope and a sight supporting element secured to the free end of the strip, the sleeve having recesses cut thereinto adjacent the strip to cause the latter to emanate from a central section of the sleeve.

RUDOLF NOSKE.